(12) United States Patent
Ohga

(10) Patent No.: US 6,850,640 B2
(45) Date of Patent: Feb. 1, 2005

(54) IMAGE PROCESSING APPARATUS AND METHOD

(75) Inventor: Manabu Ohga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 722 days.

(21) Appl. No.: 09/909,949

(22) Filed: Jul. 23, 2001

(65) Prior Publication Data

US 2002/0021833 A1 Feb. 21, 2002

(30) Foreign Application Priority Data

Jul. 25, 2000 (JP) ........................................ 2000-224284

(51) Int. Cl.$^7$ .......................... G06K 9/00; H04N 1/419
(52) U.S. Cl. ..................................... 382/162; 358/3.26
(58) Field of Search .............................. 382/162, 167, 382/195, 275, 294; 358/1.9, 3.26, 453, 518, 520, 530; 345/589, 590; 356/402

(56) References Cited

U.S. PATENT DOCUMENTS

| | | | | |
|---|---|---|---|---|
| 5,333,069 A | * | 7/1994 | Spence | 358/517 |
| 5,809,164 A | * | 9/1998 | Hultgren, III | 382/162 |
| 5,875,040 A | * | 2/1999 | Matraszek et al. | 358/453 |
| 6,204,923 B1 | * | 3/2001 | Willing | 356/402 |
| 6,542,634 B1 | * | 4/2003 | Ohga | 382/167 |
| 6,608,925 B1 | * | 8/2003 | Edge et al. | 382/162 |
| 6,714,924 B1 | * | 3/2004 | McClanahan | 706/15 |
| 6,717,673 B1 | * | 4/2004 | Janssen et al. | 356/402 |
| 6,741,260 B2 | * | 5/2004 | Hirayama et al. | 345/589 |
| 6,778,211 B1 | * | 8/2004 | Zimmermann et al. | 348/218.1 |

OTHER PUBLICATIONS

U.S. Appl. No. 09/358,407, filed Jul. 22, 1999.
U.S. Appl. No. 09/358,410 filed Jul. 22, 1999.

* cited by examiner

*Primary Examiner*—Andrew W. Johns
*Assistant Examiner*—Amir Alavi
(74) *Attorney, Agent, or Firm*—Fitzpatrick, Cella, Harper & Scinto

(57) ABSTRACT

When one viewing condition parameter is applied to all pixels, a visual effect between a single color and a background expressed on a rasterized image cannot be reflected on a color matching result. To prevent this, when color matching using a human color appearance model is to be performed, the distance between an image and a viewer and the resolution of the image are input. On the basis of the input distance and resolution, a stimulus region, adjacent region, and background region based on a plurality of field angles (e.g., 2°, 4°, and 10°) for a pixel of interest on the image are defined, thereby determining a viewing condition parameter and performing color matching.

16 Claims, 10 Drawing Sheets

IMAGE PROCESSING APPARATUS AND METHOD

FIELD OF THE INVENTION

The present invention relates to an image processing apparatus and method and, more particularly, to color matching under different viewing conditions.

BACKGROUND OF THE INVENTION

A human color appearance model is so designed as to allow correctly predicting how a color is seen when a color chip having a field angle of 2° is given. FIG. 1 is a view showing the definition of a human visual field. A CIE 1931 standard calorimetric observer is applicable to the range of a field angle of 1° to 4°. Therefore, this applicable region is divided into a stimulus region having a field angle of 2° or less, an adjacent region having a field angle of 4° or less, a background region from the adjacent region to a region having a field angle of 10°, and a surrounding region around this background region. Also, a visual field region including all these regions is an adaptation region.

CIE CAM97s is a representative color appearance model, and in this model the following can be set as viewing condition parameters.

La: Absolute luminance [cd/m$^2$] in adaptation region
   Normally, 20% of white point absolute luminance in adaptation region
XYZ: Relative XYZ value of color chip
XwYwZw: Relative XYZ value of white point
Yb: Relative luminance of background region
Surround conditions:
   Average Surround (larger than a field angle of 4° of a color chip)
   Average Surround (equal to or smaller than a field angle of 4° of a color chip)
   Dim Surround
   Dark Surround
   Cut-Sheet Transparencies (on viewing box)

The surround condition is Average if the relative luminance in the surrounding region is 20% or less of a white point in the adaptation region, Dim if this value is smaller than 20%, and Dark if this value is almost 0%.

A color appearance model is derived from experimental results using monochromatic color chips. Hence, no method has been established which determines viewing condition parameters applicable to an image having a plurality of colors. That is, the relative luminance Yb of the background region is set at 20% because neutral gray is 20% of a white point.

Also, when a color appearance model is applied to an image, one viewing condition parameter is generally used for all pixels.

When one viewing condition parameter is thus applied to all pixels, a visual effect between a single color and a background expressed on a rasterized image cannot be reflected on a color matching result.

Furthermore, since an average viewing condition parameter is evenly applied to an image, no color matching result having high accuracy can be locally obtained.

SUMMARY OF THE INVENTION

The present invention has been made to individually or simultaneously solve the above problems, and has as its object to reflect a visual effect between a single color and a background expressed on an image onto a color matching result.

It is another object of the present invention to locally obtain a high-accuracy color matching result.

To achieve the above objects, a preferred embodiment of the present invention discloses an image processing apparatus for performing color matching by using a color appearance model, comprising an inputter, arranged to input a distance between an image and a viewer, and a resolution of the image, and a processor, arranged to define regions based on a plurality of field angles with respect to a pixel of interest on the image, on the basis of the input distance and resolution, thereby performing color matching.

Also, an image processing method of performing color matching by using a color appearance model, comprising the steps of inputting a distance between an image and a viewer, and a resolution of the image, and defining regions based on a plurality of field angles with respect to a pixel of interest on the image, on the basis of the input distance and resolution, thereby performing color matching is disclosed.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Image processing apparatuses according to embodiments of the present invention will be described in detail below with reference to the accompanying drawings.

First Embodiment

[Concept of Color Matching]

Figure 1:
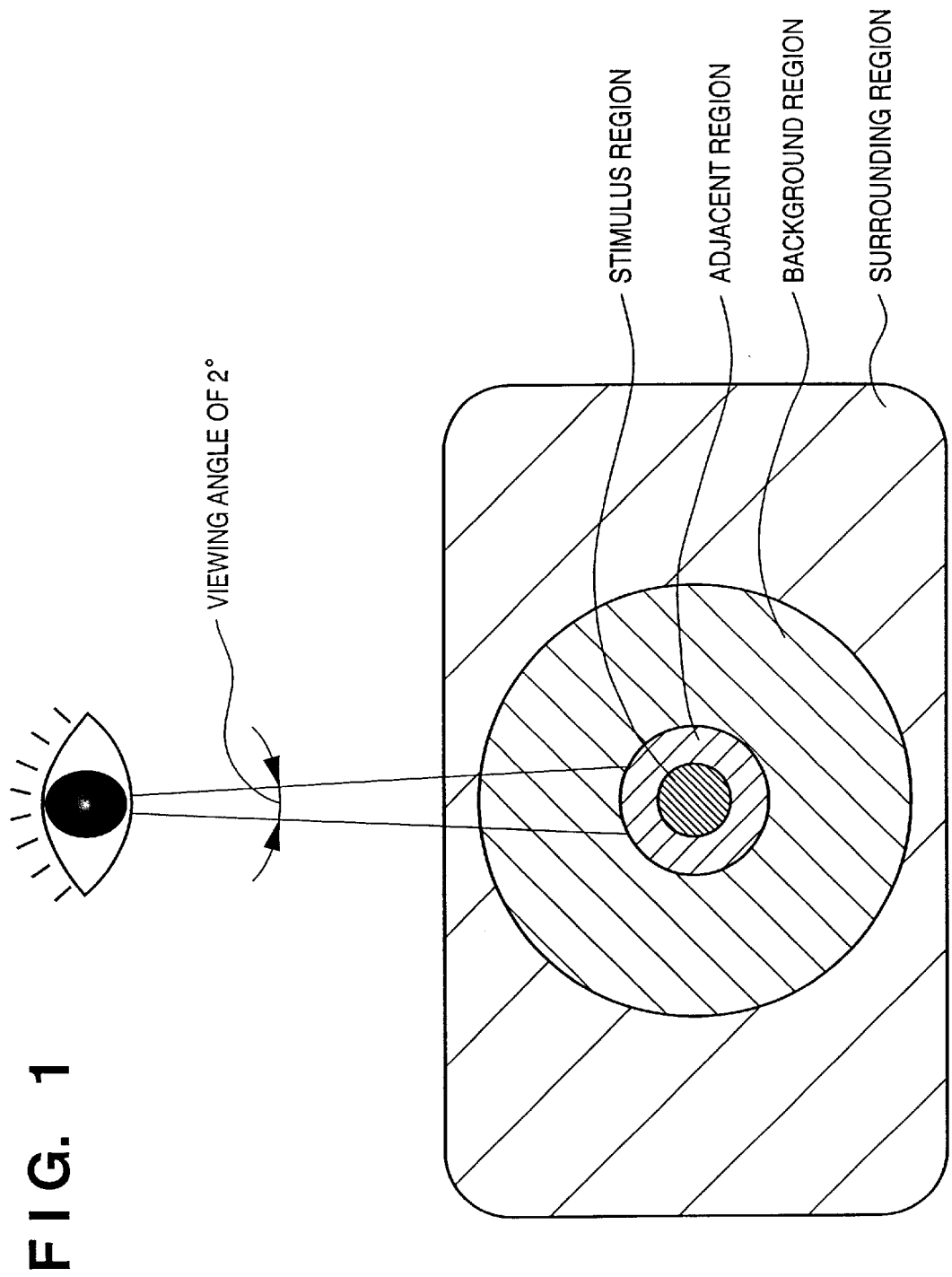
FIG. 1 is a conceptual view showing the definition of a human visual field.
Figure 2:
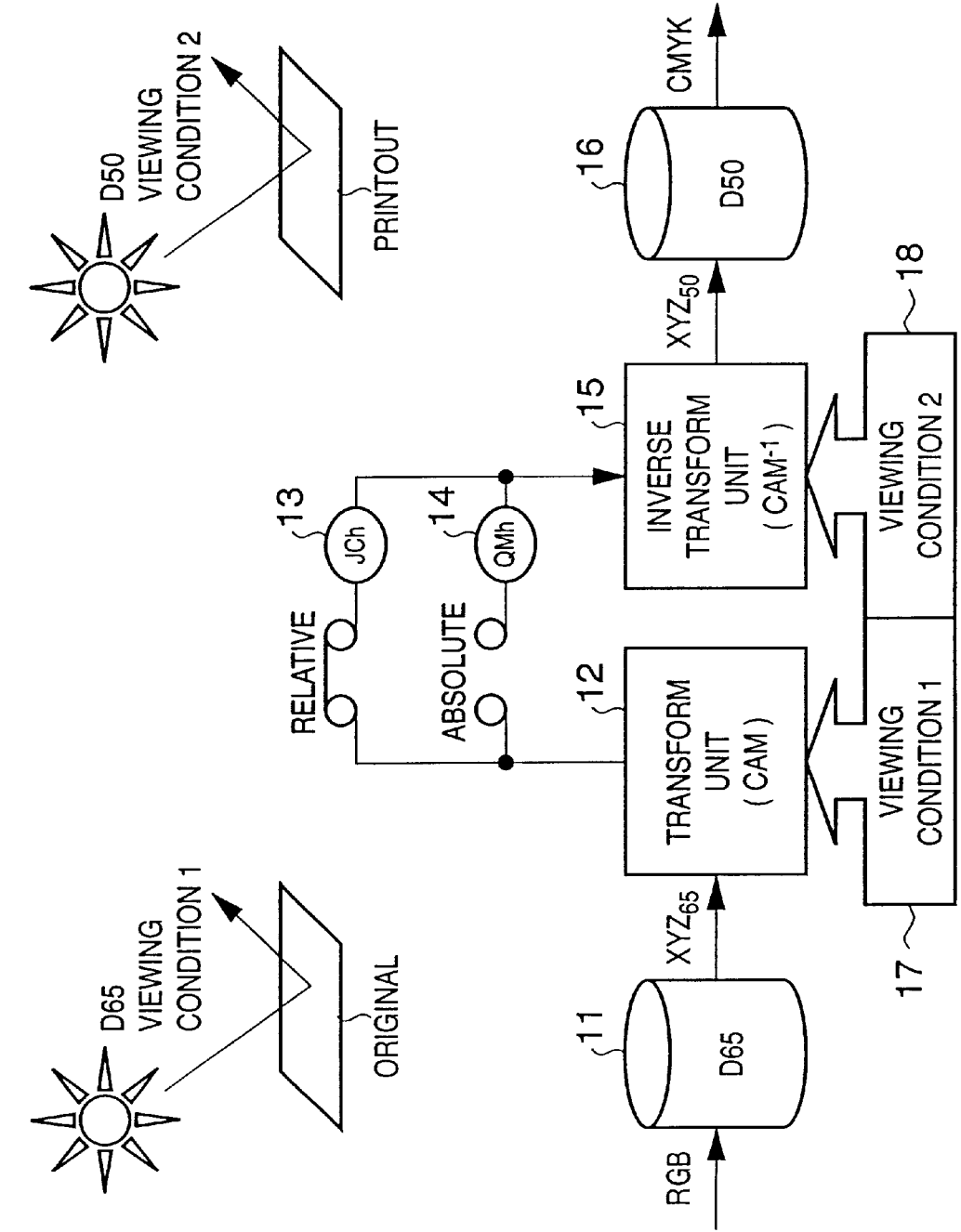
FIG. 2 is a view for explaining the concept of color matching by CAM.

FIG. 2 is a view for explaining the concept of color matching.

In FIG. 2, reference numeral 11 denotes a conversion matrix or conversion lookup table (LUT) for transforming data depending on an input device into device-independent color space data which is based on the white point reference of environmental light at the input side; 12, a color appearance model transform unit (CAM) for transforming the data obtained from the conversion LUT 11 into a human color appearance space JCh or QMh; 13, JCh (or JCH) which is a color appearance space relative to the reference white point of environmental light; 14, QMh (or QMH) which is an absolute color appearance space which changes its size in accordance with an illuminance level; 15, a color appearance model inverse transform unit (CAM$^{-1}$) for transforming the human color appearance space JCh or QMh into device-independent color space data based on the reference white point of environmental light at the output side; 16, a conversion LUT for transforming the data obtain from the inverse transform unit 15 into color space data depending on an output device; 17, a viewing condition parameter on the input side; and 18, a viewing condition parameter on the output side.

Note that the input and output devices are not limited to color spaces such as RGB and CMY(K), but can be arbitrary image input/output devices such as a digital still camera, digital video camera, monitor, and printer. Note also that a computer apparatus such as a personal computer is applicable to an image processing apparatus for executing color matching itself, but this function can also be imparted to the input/output devices.

Generally, a white point of environmental light under viewing conditions is different from a white point of a standard light source when a color chip such as a color target or color patch is measured. For example, a standard light source used in colorimetry is D50 or D65. However, environmental light when an image is actually viewed is not restricted to D50 or D65 but is often illuminating light such as an incandescent lamp or fluorescent lamp or mixed light of illuminating light and sun light. In the following explanation, the light source characteristics of environmental light under viewing conditions are D50, D65, or D93 for the sake of simplicity. In practice, however, the XYZ value of a white point on a medium is set as a white point.

When CIE CAM97s, for example, is applied as a color appearance model, the viewing condition parameter 17 on the input side and the viewing condition parameter 18 on the output side are as follows.

La: Absolute luminance [cd/m$^2$] in adaptation region

XYZ: Relative XYZ value of color chip

XwYwZw: Relative XYZ value of white point

Yb: Relative luminance of background region

Surround conditions:
  Average Surround (average, larger than a field angle of 4° of a color chip)
  Average Surround (average, equal to or smaller than a field angle of 4° of a color chip)
  Dim Surround (dim)
  Dark Surround (dark)
  Cut-Sheet Transparencies (on viewing box)

Input device-dependent image data is transformed into a relative XYZ value under environmental light at the input side by the transformation LUT 11.

[Process Configuration]

Figure 3:
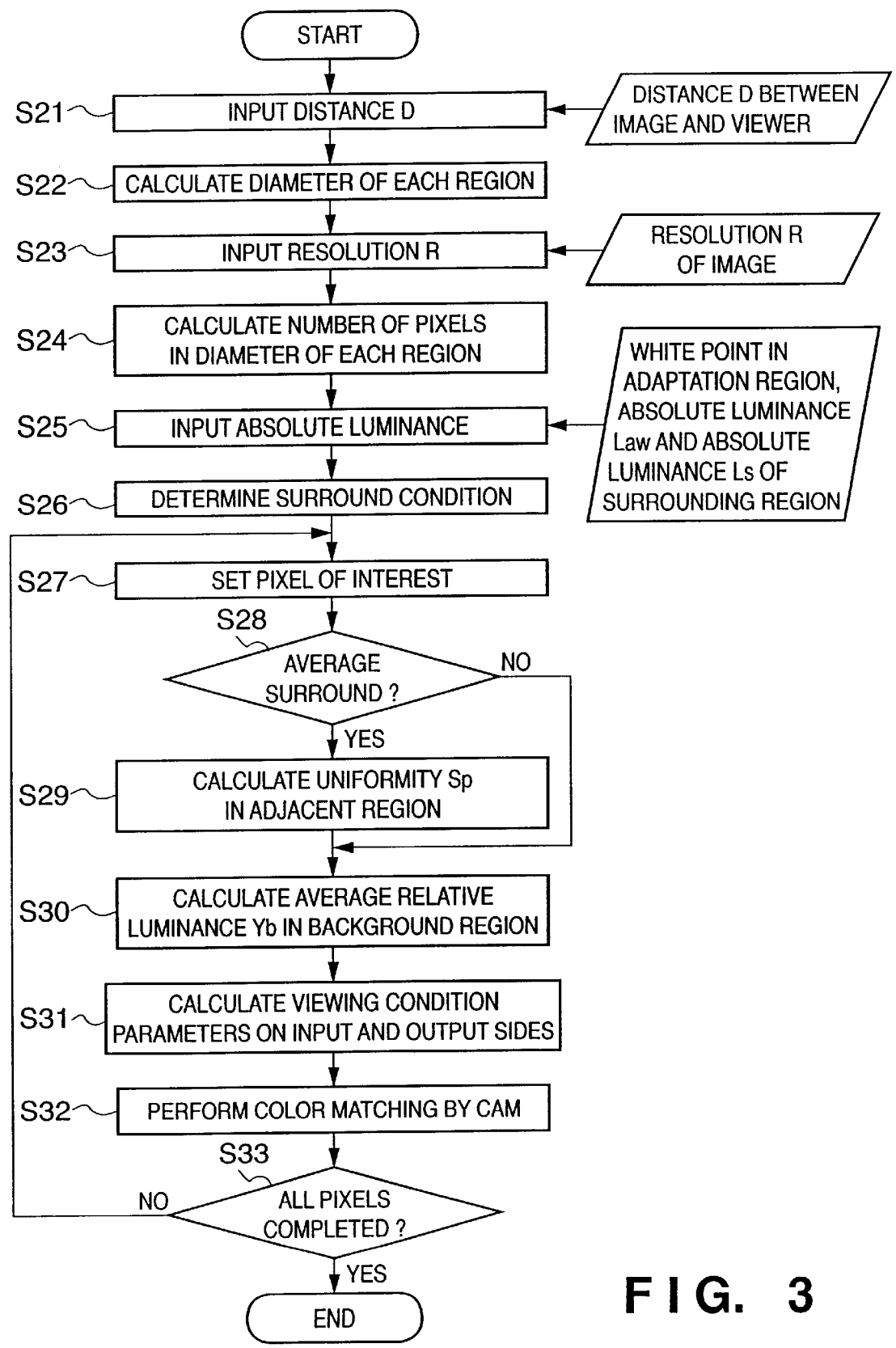
FIG. 3 is a flow chart showing the process configuration of the first embodiment.

FIG. 3 is a flow chart showing the process configuration of this embodiment. Although a practical hardware arrangement for implementing the process configuration will not be explained, this process configuration is implemented by supplying a program corresponding to the configuration to a personal computer or the like.

Figure 4:
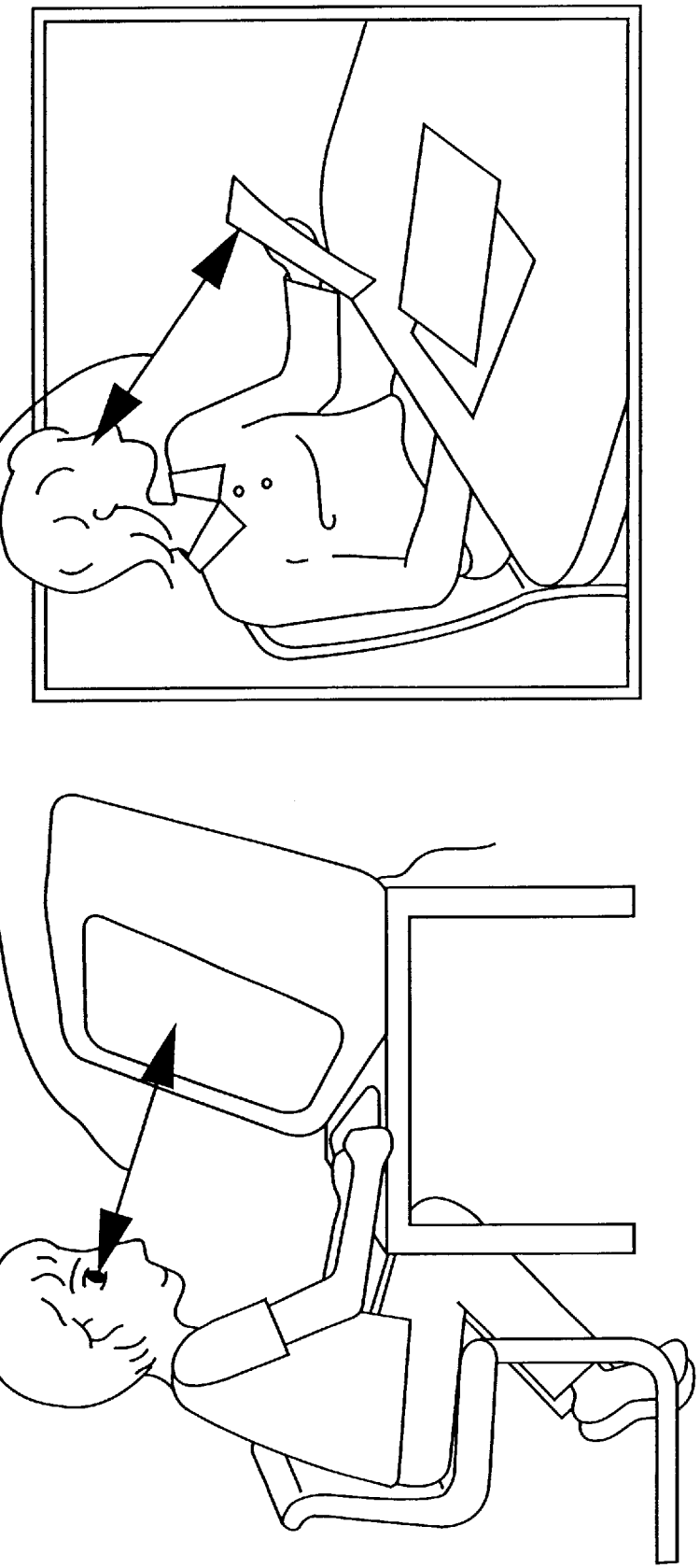
FIG. 4 is a view for explaining the distance from a monitor screen or a printed product to a viewer.

First, a user inputs a distance D between an image and a viewer (S21). As shown in FIG. 4, the distance between a monitor screen or a printed product to a viewer is 0.4 to 0.7 m. However, a given distance D can be set by user input. In this embodiment, D=0.5 m is used as an example. Note that the set value of the distance D between an image and a viewer on the input side can be different from that on the output side.

Figure 5:
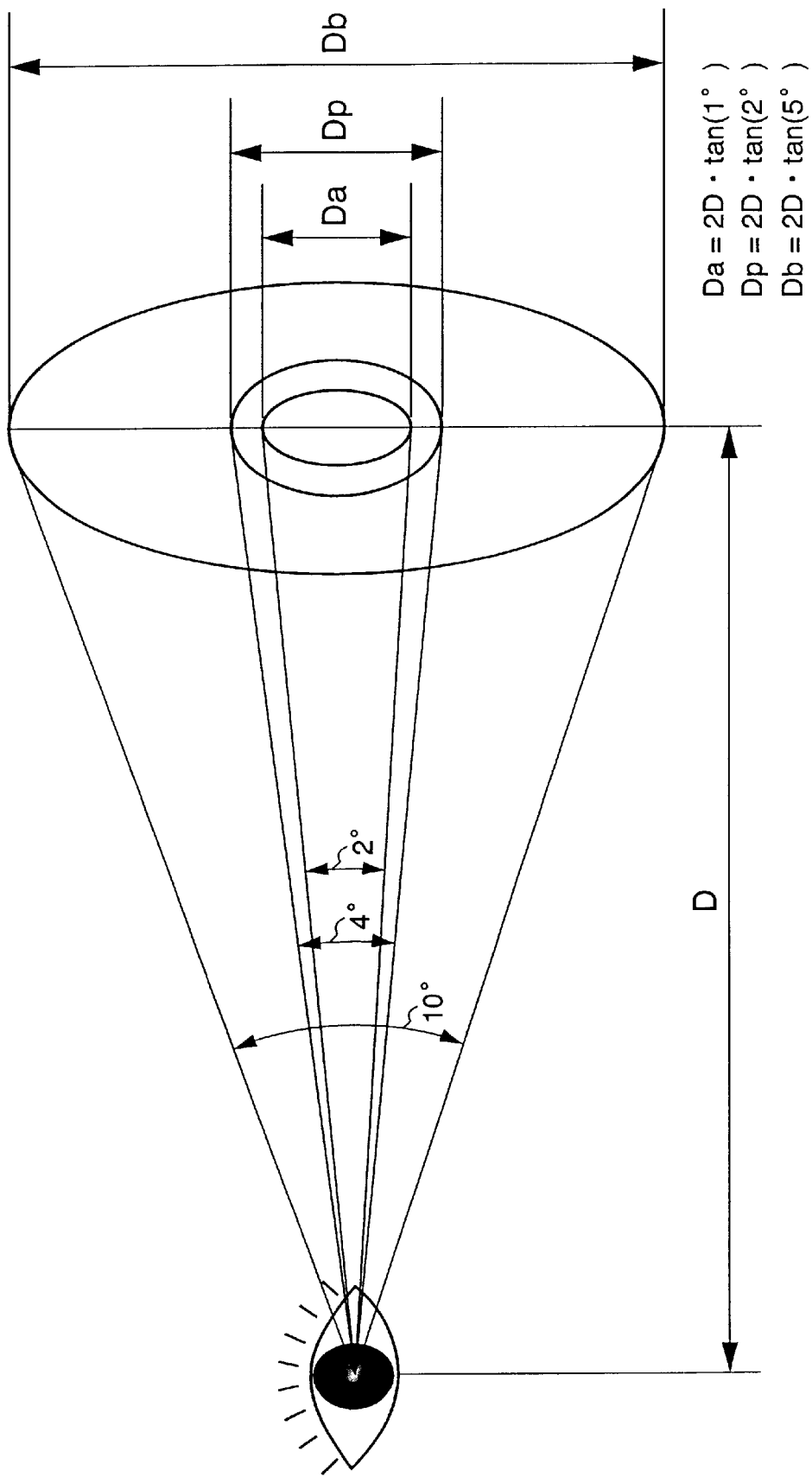
FIG. 5 is a view for explaining a method of calculating the diameters of a stimulus region, adjacent region, and background region from a distance D between an image and a viewer.

Next, the diameters of a stimulus region, adjacent region, and background region are calculated from the distance D between an image and a viewer. As FIG. 5 shows, the line of sight and the surface of an image presumably intersect at a substantially right angle. Therefore, a diameter Da of the stimulus region having a field angle of 2° or less, a diameter Dp of the adjacent region having a field angle of 4° or less, and a diameter Db of the background region having a field angle of 10° or less are as follows.

$$Da=2\times D\times \tan(1°)$$

$$Dp=2\times D\times \tan(2°)$$

$$Db=2\times D\times \tan(5°)$$

If D=0.5 m, Da=17 mm, Dp=35 mm, and Db=87 mm.

The user inputs resolution R (pixels/inch) of an image (S23). For example, this resolution R is 72 ppi for an image displayed on a monitor and 400 ppi, which is a printer resolution, for a printout image. In practice, the resolution R depends upon a resolution or a zoom ratio designated by an application or a device driver. Note that this resolution has the same value at the input and output sides.

Subsequently, the numbers of pixels on the image corresponding to the stimulus pixel region, adjacent pixel region, and background pixel region are calculated (S24). The numbers Dap, Dpp, and Dbp of pixels in the diameters of the stimulus region, adjacent region, and background region, respectively, are as follows.

$$Dap=Da\times R/0.0254$$

$$Dpp=Dp\times R/0.0254$$

$$Dbp=Db\times R/0.0254$$

Figure 6:
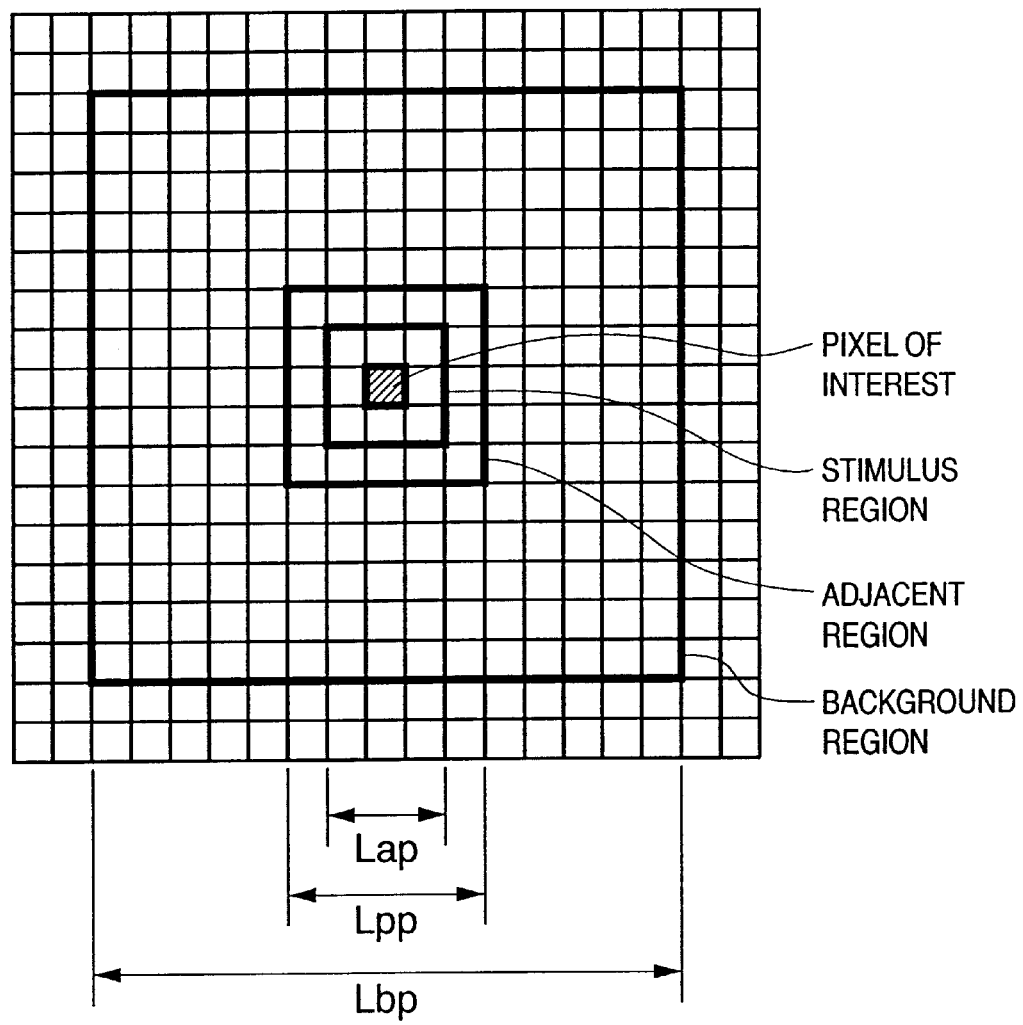
FIG. 6 is a view showing a pixel of interest in an image and regions corresponding to different field angles.

If D=0.5 m and R=72 ppi, Dap=48.2, Dpp=99.0, and Dbp=246.6. For simplicity, as shown in FIG. 6, assume a square region having 2n+1 pixels (n is a positive integer) on each side. Length L of one side of this square region is calculated such that the area of a circular region and the area of the square region are equal. Since L=√π×D/2=0.886×D, the side lengths of the individual regions are Lap=43 pixels, Lpp=87 pixels, and Lbp=219 pixels. If D on the input side and D on the output side are different, it is only necessary to calculate the number of pixels corresponding to the length of one side of each region independently for the input and output sides.

The user then inputs white point absolute luminance Law [cd/m$^2$] of the adaptation region and absolute luminance Ls [cd/m$^2$] of the surrounding region on the basis of values indicated by a meter and the like (S25).

The white point absolute luminance of the adaptation region can be calculated by the absolute luminance [cd/m$^2$] of a monitor white point in the case of a monitor, and by (illuminance [lux]/π on a printed product) in the case of a printed product. The absolute luminance of the surrounding region is strictly the absolute luminance of a region having a field angle larger than 10° with respect to a pixel of interest. For the sake of simplicity, however, this absolute luminance is in the case of a monitor the ambient absolute luminance of the monitor, and in the case of a printed product the ambient absolute luminance of the printed product. Note that different values can be set as each absolute luminance in accordance with the viewing conditions on the input and output sides.

Subsequently, the surround conditions are determined by, e.g., the following conditions (S26).

If $0.2 \leq Ls/Law$, Average Surround

If $0.06 < Ls/Law < 0.2$, Dim Surround

If $Ls/Law \leq 0.06$, Dark Surround

If Ls and Law on the input side are different from those on the output side, the surround conditions are independently determined on the input and output sides.

Next, a pixel of interest with respect to an input image is set (S27). For example, the following processing is performed for all pixels from the upper left to the lower right of the image.

First, whether the surround condition on the input or output side is Average Surround is checked (S28). If the condition is Average Surround, uniformity Sp in the adjacent region is calculated (S29).

That is, in the adjacent region (including the pixel of interest and the stimulus region) having the side length Lpp, maximum and minimum Y values Ymax and Ymin are calculated from the XYZ value of each pixel. Uniformity Sp=(Ymax−Ymin)/100 is then calculated. If, for example, $Sp \leq 0.01$, this adjacent region is regarded as a uniform region. If the adjacent region is considered to be a uniform region, Average Surround (larger than a field angle of 4° of a color chip) is applied as the surround condition; if the adjacent region is nonuniform, Average Surround (equal to or smaller than a field angle of 4° of a color chip) is applied as the surround condition. Note that if the distance D at the input side is different from the distance D at the output side, the ranges of the adjacent region are also different, so the calculations are independently performed on the input and output sides.

Subsequently, in the background region (not including the pixel of interest, stimulus region, and adjacent region) having the side length Lbp as shown in FIG. 5, average relative luminance Yb of Y is calculated from the XYZ value of each pixel (S30). If the distance D at the input side is different from the distance D at the output side, the ranges of the adjacent region are also different, so the calculation is independently performed on the input and output sides.

Next, viewing condition parameters on the input and output sides are set (S31). For example, if the input side is an sRGB monitor (D65, Law=80 [cd/m$^2$], Ls=4.074 [cd/m$^2$]), the output side is a typical office environment (D50, Law=238.7 [cd/m$^2$], Ls=47.74 [cd/m$^2$]), the distance D between an image and a viewer is 0.5 m on both the input and output sides, and the resolution is 72 ppi, the viewing condition parameters are as follows.

Input-side viewing condition parameters:

La=Law×0.2=80×0.2=16 [cd/m$^2$]

XwYwZw=D65

Yb=average Y of input-side background region (one side=219 pixels) with respect to each pixel of interest Surround condition: Dark Surround (Ls/Law=4.074/80= 0.051)

Output-side viewing condition parameters:

La=Law×0.2=238.7×0.2=47.74 [cd/m$^2$]

XwYwZw=D50

Yb=average Y of output-side background region (one side=219 pixels) with respect to each pixel of interest Surround condition: Average Surround (Ls/Law=47.74/ 238.7=0.2)

The average relative luminance Yb on the output side should be calculated from the XYZ value at the output side. However, the XYZ value on the output side is unpresumable in this stage, so the average relative luminance Yb at the output side is approximated by using the XYZ value on the input side. Also, the surround condition on the output side is Average Surround. Therefore, processing similar to step S29 is performed; the viewing condition parameter "larger than a field angle of 4° of a color chip" or "equal to or smaller than a field angle of 4° of a color chip" is set in accordance with the uniformity of a partial image in the adjacent region.

Finally, color matching is performed by the CAM 12 by using the viewing condition parameters at the input and output sides (S32), thereby calculating the output-side XYZ value corresponding to the input-side XYZ value. Steps S27 to S32 are repeated until it is determined in step S33 that analogous processing is completely performed for all pixels in the image. In this way, color matching is performed for the whole image.

[Processing of Edge of Image]

Figure 7:
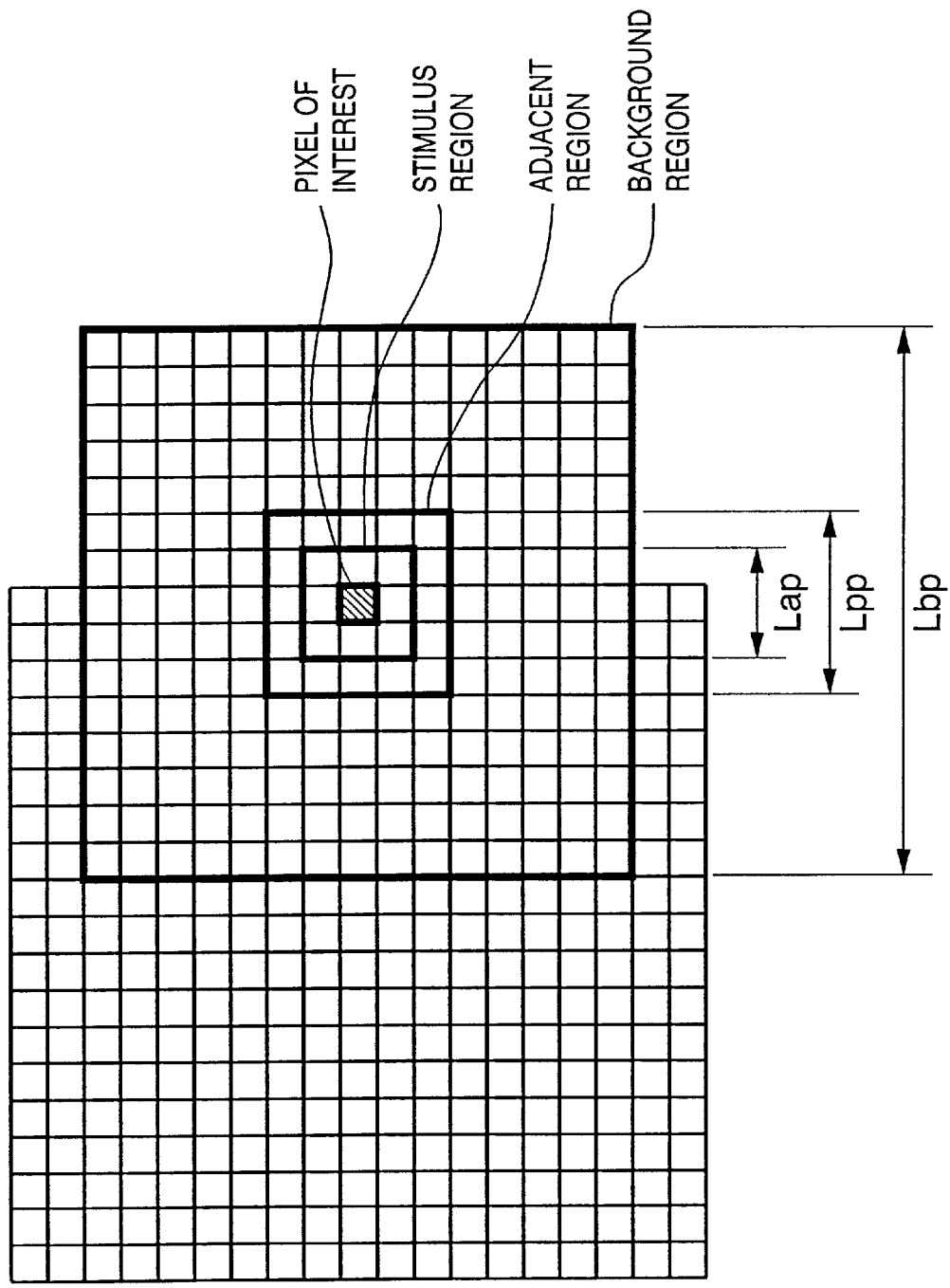
FIG. 7 is a view showing lack of pixels in processing near the edge of an image.

If a pixel of interest is set near the edge of an image as shown in FIG. 7, pixels in the stimulus region and the adjacent region are omitted in the process of step S29. Likewise, pixels in the background region are omitted in step S30. In a case like this, Ymax, Ymin, and Yb are obtained from effective pixels without processing these omitted pixels.

As another method of preventing a lowering of the processing speed caused by determination of the presence/absence of omission of pixels near the edge of an image, a value such as Y=100, Y=20, or the relative luminance of the surrounding region can be set for an omitted pixel (as an omitted pixel) in accordance with the frame or the ambient situation of an assumed image. In this manner, processing can be performed without any omitted pixels.

As described above, the first embodiment can achieve the following effects.

(1) By using the distance D between an image and a viewer and the resolution R of the image, regions having different field angles (e.g., 2°, 4°, and 10°) with respect to a pixel of interest can be defined on the image.

(2) A circular region with respect to a field angle is approximated to a square region in an image. This can increase the speed of processing in that region.

(3) By calculating the uniformity Sp at a field angle of 4° or less in an image, it is possible to determine which of "larger than a field angle of 4° of a color chip" or "equal to or smaller than a field angle of 4° of a color chip" is to be used as a viewing condition parameter of Average Surround.

(4) By calculating the average relative luminance Yb of the background region with respect to a pixel of interest in an image, this value can be set as a viewing condition parameter for the pixel of interest.

(5) In processing near the edge of an image, a specific value (e.g., Y=100, Y=20, or the relative luminance of the surrounding region) is set for omitted pixels in the adjacent region and the background region. This can increase the speed of the processing near the edge.

Second Embodiment

An image processing apparatus of the second embodiment according to the present invention will be described below. In the second embodiment, the same reference numerals as in the first embodiment denote the same parts, and a detailed description thereof will be omitted.

In the first embodiment, an image object or a rasterized object has been primarily explained. In the second embodiment, color matching mentioned above is applied to a graphical object before rasterization.

Average relative luminance Yb of the background region can be obtained by analyzing the order of overlap of objects, and referring to colors in the objects and the colors of objects in the background in accordance with the sizes of the objects. A method of determining whether "larger than a field angle of 4° of a color chip" in the case of Average Surround will be explained as an example.

Figure 8:
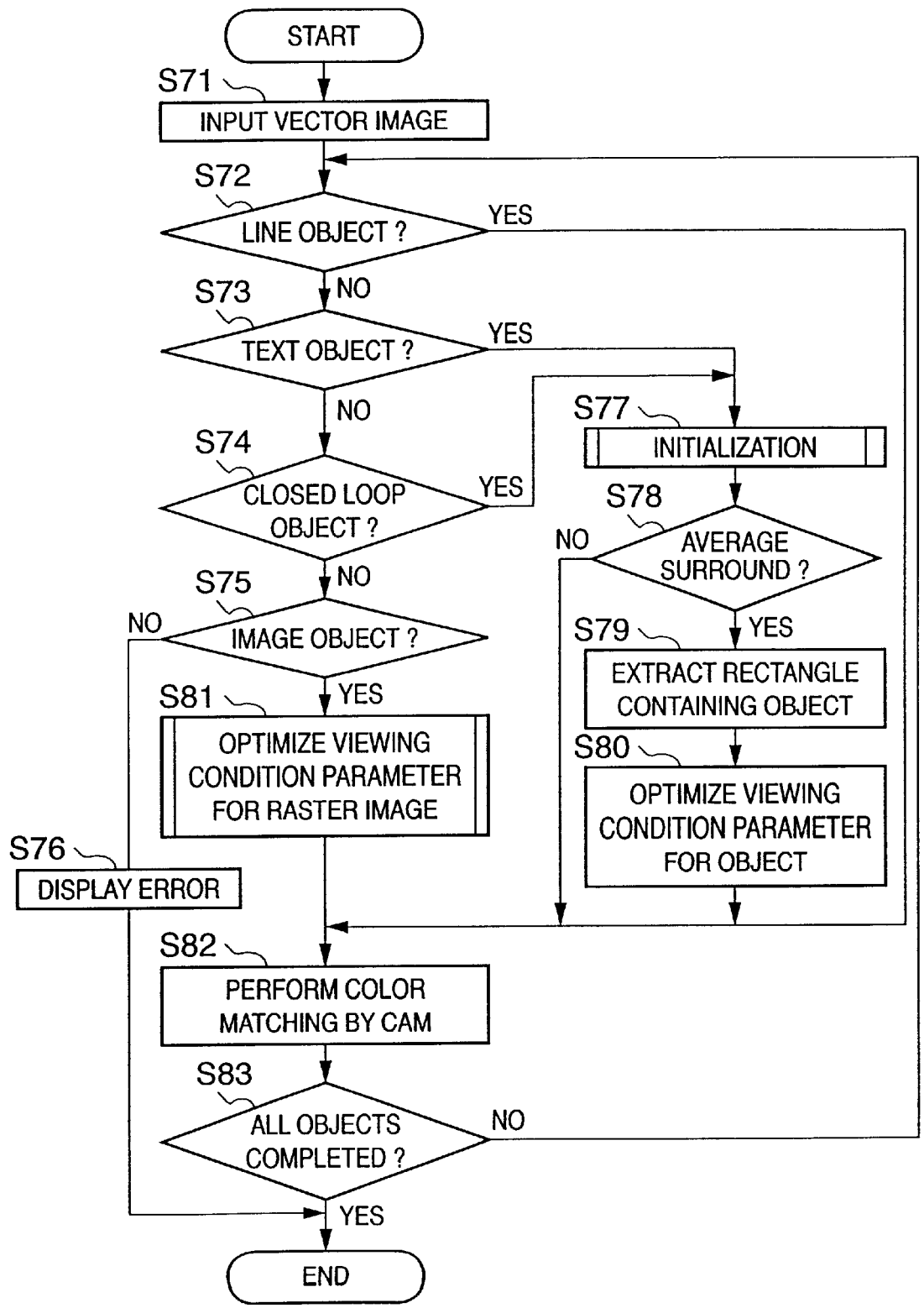
FIG. 8 is a flow chart showing the process configuration of the second embodiment.

FIG. 8 is a flow chart showing the process configuration of the second embodiment.

First, a vector image to be displayed on a monitor or printed out is input (S71), and the type of the input object is detected (S72 to S75). If the input object is not detected as any object, the process is terminated by displaying an error message (S76).

If Input Object is Text Object or Closed Loop Object

In this case, processes corresponding to steps S21 to S26 shown in FIG. 3 are performed in initialization (S77) to predetermine a region (adjacent region) corresponding to a field angle of 4° and a surround condition.

Subsequently, whether the surround condition is Average Surround is checked (S78). If the condition is Average Surround, a rectangle containing the object is calculated for simplification, and whether this rectangle is larger than the region having a field angle of 4° is checked. That is, a rectangle containing the object is extracted (S79). This rectangle containing the object is compared with a square (equivalent to Lpp=87 pixels if D=0.5 m and R=72 ppi) having a field angle of 4°, thereby optimizing a viewing condition parameter for the object (S80).

More specifically, in the process of step S80, if both longitudinal and lateral sides of the rectangle are larger than Lpp, it is determined that "larger than a field angle of 4°". If one of the longitudinal and lateral sides is shorter, the analysis is further advanced. If the short side of the rectangle $\geq 0.8 \times Lpp$ and the area is larger than the region (Lpp [m²]) having a field angle of 4°, it is determined that "larger than a field angle of 4°"; if not, it is determined that "equal to or smaller than a field angle of 4°". Note that this determination is applicable only when the text or the closed loop is painted with a single color. To increase the accuracy of the determination, it is also possible to calculate the area (occupied ratio) of a region actually painted in the rectangular region containing the object.

If Input Object is Image Object

In this case, a viewing condition parameter is optimized by processes equivalent to steps S21 to S31 shown in FIG. 3 (S81).

If Input Object is Line Object

When this is the case, the possibility of "larger than a field angle of 4° of a color chip" is low. Therefore, the process of optimizing a viewing condition parameter is skipped.

When a viewing condition parameter for each object is set by the above processing, color matching by a CAM 12 is performed (S82). The processes from steps S72 to S82 are repeated until it is determined in step S83 that all objects are completely processed. In this way, color matching of the whole vector image is completed.

By thus detecting objects, processing for a field angle can be performed not only for a raster image but also for a vector image.

Third Embodiment

An image processing apparatus of the third embodiment according to the present invention will be described below. In the third embodiment, the same reference numerals as in the first embodiment denote the same parts, and a detailed description thereof will be omitted.

Figure 9:
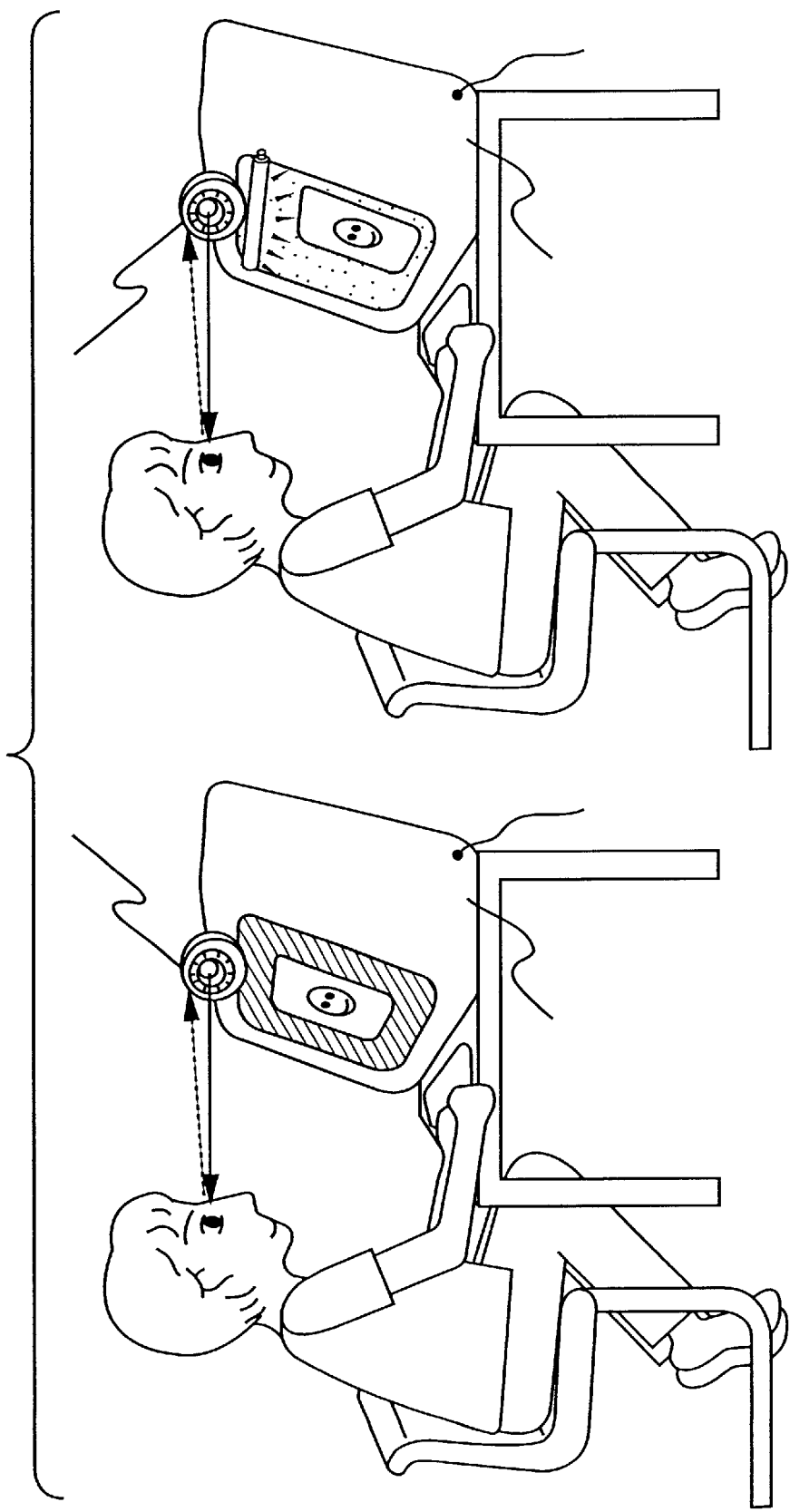
FIG. 9 is a view showing an arrangement in which a distance measurement sensor is placed on a monitor or a viewing box.

In step S21 of FIG. 3, a user inputs a distance D between an image and a viewer. This process can be automated by the use of a distance measurement sensor. As an example, a distance measurement sensor which measures a distance on the basis of the reflection time of infrared radiation is placed on a monitor or a viewing box (FIG. 9).

If a measurement sensor is difficult to install or is not connected to a host, the distance D can be manually set. It is of course also possible to input a numerical value (distance) displayed on a measurement sensor when the sensor is offline (not connected to a host machine).

Figure 10:
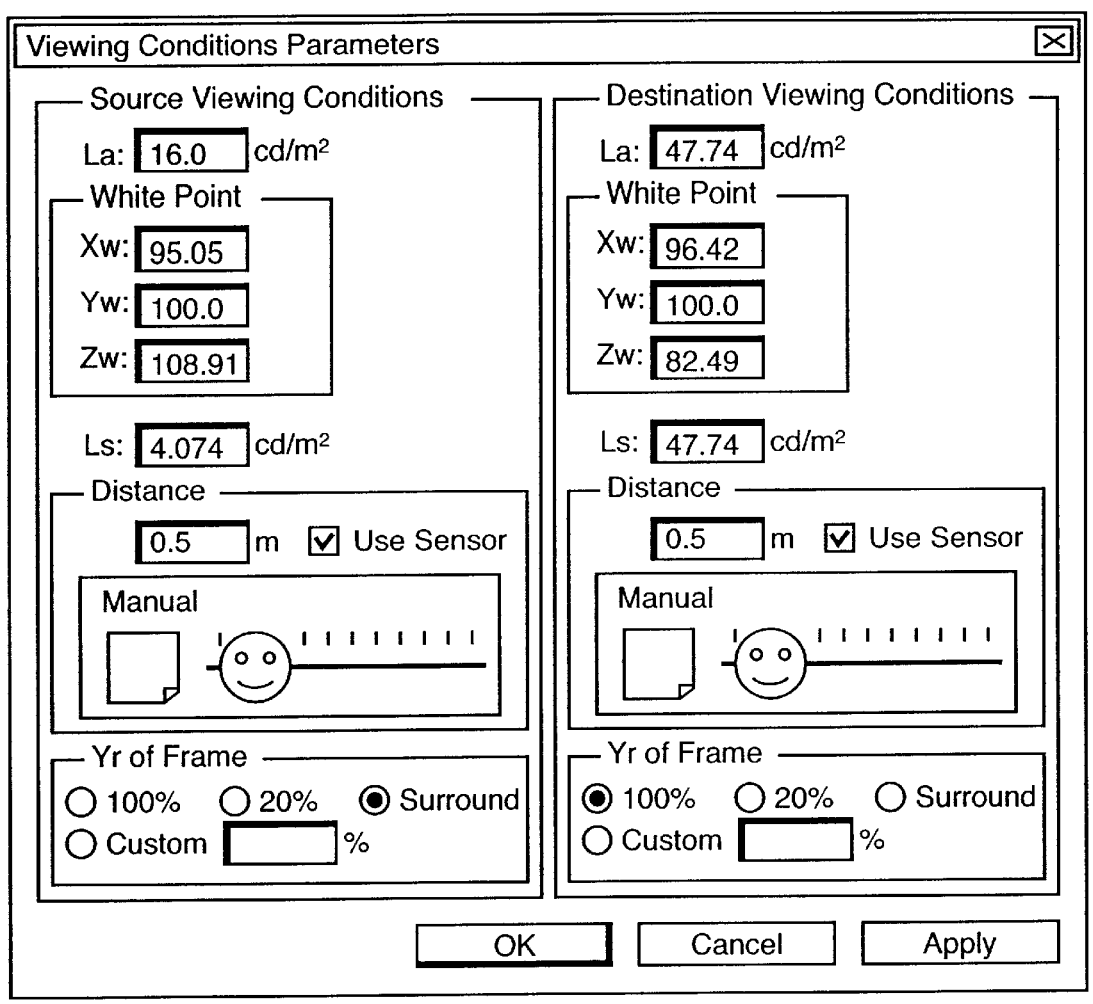
FIG. 10 is a view showing a user interface for setting relative luminance values for lacking pixels in processing near the edge of an image.

Furthermore, in processing near the edge of an image, a relative luminance value for an omitted pixel can be set by a user interface shown in FIG. 10. Although a default value is 20%, 100% can be set when the background is white, and an ambient relative luminance value can be set for a frameless image. If an actual relative luminance value is obtained, a custom value can also be input.

As described above, the distance D between a user and an original, monitor, or printed product can be accurately set by the use of a distance measurement sensor.

Modification of the Embodiments

In each of the above embodiments, the magnification of an image is not changed. However, a viewing condition parameter can also be set in accordance with zoom magnification Z. For example, if the sides of the stimulus region, adjacent region, and background region with respect to a direct image are Lap, Lpp, and Lbp, respectively, when the distance D between an image and a viewer and the resolution R of the image are given, the sides of these regions with respect to the zoom magnification Z are given as follows on the original image if the distance D is fixed. By using these values in the aforementioned processing, the processing can be controlled even when the magnification of the image is changed.

$$Lap'=Lap \times (1/Z)$$

$$Lpp'=Lpp \times (1/Z)$$

$$Lbp'=Lbp \times (1/Z)$$

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus for performing color matching by using a color appearance model, comprising:
    an inputter, arranged to input a distance between an image and a viewer, and a resolution of the image; and
    a processor, arranged to define regions based on a plurality of field angles with respect to a pixel of interest on the image, on the basis of the input distance and resolution, thereby performing color matching.

2. An image processing method of performing color matching by using a color appearance model, comprising the steps of:
    inputting a distance between an image and a viewer, and a resolution of the image; and
    defining regions based on a plurality of field angles with respect to a pixel of interest on the image, on the basis of the input distance and resolution, thereby performing color matching.

3. The method according to claim 2, wherein at least 2°, 4°, and 10° are used as the plurality of field angles.

4. The method according to claim 2, wherein in the color matching step, circular regions corresponding to the plurality of field angles are approximated to square regions to thereby increase the speed of processing in the regions.

5. The method according to claim 2, wherein in the color matching step, a viewing condition parameter for the pixel of interest is determined by using pixel values of regions corresponding to the plurality of field angles.

6. The method according to claim 2, wherein in the color matching step, on the basis of the uniformity of the image within the field angle of a color chip in the color appearance model, a parameter selected from the group consisting of "larger than the field angle of the color chip" and "not more than the field angle of the color chip" is used as an average surrounding viewing condition parameter.

7. The method according to claim 2, wherein in the color matching step, the average relative luminance of a background region with respect to the pixel of interest is used as a viewing condition parameter for the pixel of interest.

8. The method according to claim 2, wherein in the color matching step, a speed of processing performed near an edge of the image is increased by setting a specific value for omitted pixels in an adjacent region and a background region.

9. The method according to claim 8, wherein the specific value is selected from the group consisting of a luminance of 100%, a luminance of 20%, and the relative luminance of a surrounding region.

10. The method according to claim 2, wherein in the color matching step, a viewing condition parameter for each object on a vector image is determined by using the ranges of regions corresponding to the plurality of field angles.

11. The method according to claim 2, further comprising the step of measuring the distance between the image and the viewer.

12. The method according to claim 2, further comprising the step of manually inputting the distance between the image and the viewer.

13. The method according to claim 2, further comprising the step of manually inputting the relative luminance of a portion selected from the group consisting of the edge and the frame of the image.

14. A computer program product comprising a computer readable medium storing a computer program code, for an image processing method of performing color matching by using a color appearance model, comprising a process procedure code for:
    inputting a distance between an image and a viewer, and a resolution of the image; and
    defining regions based on a plurality of field angles with respect to a pixel of interest on the image, on the basis of the input distance and resolution, thereby performing color matching.

15. An image processing method of performing color matching by using a color appearance model, comprising the steps of:
    inputting a distance between an image and a viewer, and a resolution of the image;
    obtaining a background image for a pixel of interest on the image on the basis of the input distance and resolution;
    obtaining an average relative luminance value for the pixel of interest from pixel values in the obtained background region; and
    performing color matching using the color appearance model for the pixel of interest, by using the obtained average relative luminance value.

16. A computer program product comprising a computer readable medium storing a computer program code, for an image processing method of performing color matching by using a color appearance model, comprising a process procedure code for:
    inputting a distance between an image and a viewer, and a resolution of the image;
    obtaining a background image for a pixel of interest on the image on the basis of the input distance and resolution;
    obtaining an average relative luminance value for the pixel of interest from pixel values in the obtained background region; and
    performing color matching using the color appearance model for the pixel of interest, by using the obtained average relative luminance value.

* * * * *